Feb. 15, 1966 W. O. SOLBERG 3,235,780
ELECTRICAL CAPACITOR AND METHOD OF MAKING THE SAME
Filed June 18, 1963

Inventor,
Willis O. Solberg,
by Sidney Greenberg
His Attorney.

United States Patent Office 3,235,780
Patented Feb. 15, 1966

3,235,780
ELECTRICAL CAPACITOR AND METHOD
OF MAKING THE SAME
Willis O. Solberg, Fort Edward, N.Y., assignor to General
Electric Company, a corporation of New York
Filed June 18, 1963, Ser. No. 288,657
5 Claims. (Cl. 317—260)

The present invention relates to electrical capacitors, and more particularly concerns low capacity capacitors of very small bulk and a method of making such capacitors.

Conventional apparatus usually employed in large scale manufacture of wound dielectric types of electrical capacitors is not practical for winding dielectric types of electrical capacitors of extremely low capacitance, e.g., less than 1,000 picofarads. Moreover, foil type units are not feasible for such low capacitances because of the difficulty in handling the very small strips required, and also in controlling the amount of capacitance obtained. While other types of capacitors, such as stacked mica units, have been used to obtain such low capacitance values, these units in general are relatively high in cost due to the expensive material and complicated manufacturing processes entailed. Ceramic type capacitors have also been used for such purposes, but the very thin ceramic plates required for these units are subject to breakage and also such units are characterized by wide capacity-temperature coefficient variations.

It is an object of the invention to provide electrical capacitors having novel construction which overcomes the above disadvantages of known types of capacitors.

It is another object of the invention to provide electrical capacitors of very small size and very low capacitance and a method for readily and economically making such capacitors.

It is another object of the invention to provide electrical capacitors of the above type which have high capacitance per unit volume, which in manufacture are readily controlled in capacitance values and other electrical properties, and which have low power factor, improved dielectric strength and high corona starting levels.

Other objects and advantages will become apparent from the following description and the appended claims.

With the above objects in view, the present invention relates to an electrical capacitor which comprises a conducting lead member, and a capacitance device constituted by at least one composite wire member overlying the conducting lead member, the composite wire member comprising an inner conducting core, a dielectric layer on the conducting core, and a metallic coating overlying the dielectric layer, the metallic coating having extensive and substantially continuous electrically conductive contact with the conducting lead member.

In a particularly preferred embodiment of the invention, the wire shaped capacitance device is helically wound about the conducting lead member in continuous electrical contact therewith and an exposed end of the conducting core of the wire member projects from the wound coil to serve as a conductive lead wire.

The invention will be better understood from the following description taken in conjunction with the accompanying drawing, in which:

FIGURE 2a is a cross-sectional view of the FIGURE 2 device taken along the line 2a—2a;

FIGURE 3a is a cross-sectional view of the FIGURE 3 embodiment taken along the line 3a—3a.

Figure 1:
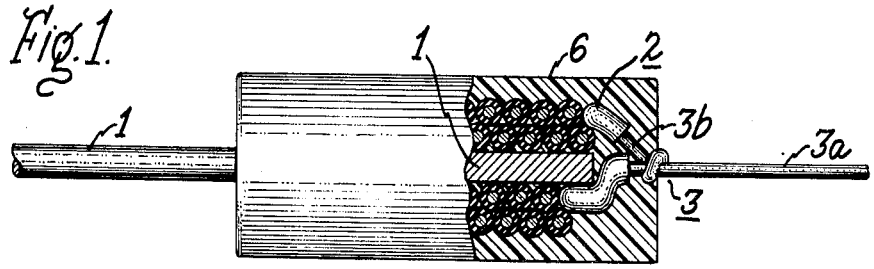
FIGURE 1 is an elevational view, partly broken away, of an embodiment of the capacitor of the invention.

Referring now to the drawing, and particularly to FIGURE 1, there is shown an electrical capacitor adapted for low capacity applications and having very small size comprising a cathode lead wire 1 of a suitable conducting material such as tinned copper wire having helically wound thereon a composite wire member 2 which constitutes the capacitance element of the assembly. As shown more clearly in FIGURE 1a, capacitance element 2 comprises a wire core 3 having dielectric layer 4 thereon, and a metallic outer coating 5. Thus, wire core 3 and metallic coating 5 constitute capacitor electrodes of opposite polarity separated by dielectric layer 4, the thickness of the latter layer determining the capacitance of the unit, as well understood in the art. In the embodiment shown in FIGURE 1, wire member 2 is wound in doubled form about lead wire 1 to form a helical coil with the free ends of wire member 2 located at one end of the coil and spaced from the inner end of lead wire 1, and with the turns of the coil in close contact with lead member 1 and each other, so as to provide an extensive continuous electrical contact between lead member 1 and conductive coating 5 of wire member 2. The free ends of wire member 2 are stripped of metallic coating 5 and dielectric layer 4 so that its wire core 3 is exposed, one end 3a projecting a substantial distance beyond the end of the coil as shown to serve as a terminal lead wire and the other end 3b being joined in electrical connection to 3a by soldering or other suitable means. As will be understood, a plurality of such composite wire members 2, if desired, may be wound in forming the coil, with all of the exposed wire cores thereof connected together.

The assembly described is encapsulated in insulating material 6, as for example an epoxy resin, phenolic resin or other plastic material, to provide additional mechanical strength and protection against moisture and other unfavorable environmental conditions.

The thickness of conducting lead member 1 should in general be about 2 to 3 times the outside diameter of wire member 2 and may have a diameter normally ranging from about 1 to about 40 mils.

Wire core 3 is typically composed of copper, but may be made of other suitable metals such as aluminum, silver, or other conductive material. Core 3 may range in diameter from very fine wire, e.g., .5 mil or even as low as .12 mil, to a maximum diameter of about 2 mils, with a diameter of 1 mil being used for typical purposes.

The dielectric coating 4 on wire core 3 may be any of a variety of materials such as insulating enamel composed of polyvinyl formal, polyesters, polyethylene, fluorocarbon plastics such as polytetrafluoroethylene, and the like. The dielectric material should be sufficiently flexible to permit winding of wire member 2 tightly about conducting lead member 1 without damage to the insulating layer 4. Typically, the dielectric thickness is about ¼ mil, but it may range normally from about .05 mil to about 2 mils. In general, the higher the voltage to which the unit is to be subjected, the thicker would be the dielectric layer 4. The thinner the dielectric layer, the higher the capacitance of the unit.

In accordance with one aspect of the invention, the optimum ratio of the outer diameter $D_1$ of dielectric layer 4 to diameter $D_2$ of inner wire 3 is about 3.5, since it can be shown that with such a ratio it is possible to obtain the maximum capacitance per cubic inch of the wire member 2 for a given thickness of dielectric layer. Thus, by way of illustration, inner wire core 3 may have a diameter of .8 mil and dielectric layer 4 would have an outer diameter of 2.8 mils.

Counter electrode coating 5 is typically composed of aluminum, but may be made of other metals such as zinc, silver, or gold or any other suitable conductive material and may be applied to dielectric layer 4 by conventional means, such as by vacuum evaporation schooping, chemical deposition, spraying, or by other suitable techniques.

The thickness of electrode coating 5 is preferably of the order of .005 mil in order to provide for clearing (self-healing) of capacitance member 2 when sufficient current is applied, but where this is not a consideration, there would be no upper limit to the thickness of the electrode layer. If desired, e.g., for purposes of increased conductivity and mechanical strength, molten metal (not shown) may be applied to dielectric coated wire 3, with or without the presence of metallic layer 5, after it is wound in place on conducting lead 1. The solidified metal mass thereby embedding the coiled wire member provides a very low resistance path from all surfaces of the coiled wire member to the conductive lead 1, and increases the mechanical strength of the connection.

By virtue of winding wire member 2 in doubled form and locating the free ends thereof at one end of the coil away from lead member 1 as described, there is avoided the risk of inadvertent contact betwen lead wire 1 and wire core 3 which might more readily occur if wire member 2 were wound in single form with one free end thereof at the end of the coil from which lead wire 1 emerges. A further and even more significant advantage of the arrangement shown is that the interconnection of the two free ends 3a and 3b at one end of the coil as described provides for reduced resistance to current flow in wire core 3 and thereby results in a corresponding reduction in power factor of the capacitor unit, as compared to a single wire winding. This is of particular concern in the use of small diameter, and hence high resistance, wire members.

It will be understood that, if desired, the portions of lead wires 1 and 3a external to the encapsulated assembly may be constituted by separate conducting leads suitably joined, as by welding, to the respective interiorly located wire portions, preferably within the encapsulation material 6, especially where it is desired to use very thin interior conducting wire portions while providing thicker external leads which are better suited for supporting purposes.

Figure 1A:
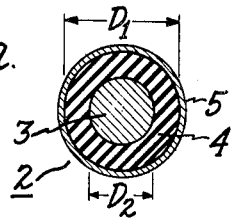
FIGURE 1a is a cross-sectional view of the wire member employed in the FIGURE 1 device.
Figure 2:
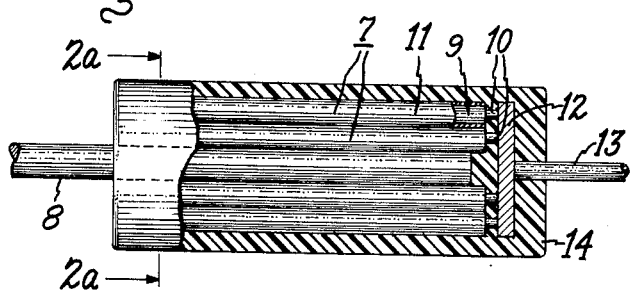
FIGURE 2 is an elevational view, partly broken away, of another embodiment of the invention.
Figure 2A:
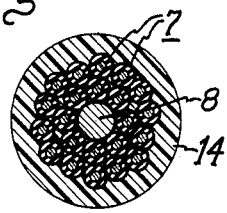

FIGURE 2 is an elevational view partly broken away of another embodiment of the invention wherein straight lengths of composite wire members 7 are arranged circumferentially about conducting lead 8 extending along the length of the latter in electrical contact therewith, as shown in greater detail in FIGURE 2a. In this embodiment, wire members 7 would have structure similar to that of wire member 2 shown in FIGURE 1a, except that dielectric layer 9 which separates inner wire core 10 from outer metal coating 11 would normally be composed of ceramic material, such as glass, barium titanate, or metallic oxides. Because of the brittle nature of such a ceramic dielectric layer, the straight configuration of the FIGURE 2 embodiment is employed, rather than the coiled arrangement shown in FIGURE 1. Similarly to the FIGURE 1 device, however, extensive and substantially continuous electrical contact between the outer metal coatings of the multiple composite wire members 7 and conducting lead 8 also characterizes the FIGURE 2 construction. At the end of the assembly opposite that from which lead 8 projects, inner wires 10 of the circumferentially grouped wire members 7 are exposed and soldered (or otherwise joined) in electrical connection with one side of a conducting disc 12 to which is secured a lead member 13 on its other side. As in the previously described embodiment, the assembly is encased in an enclosure 14 of resin material, as shown.

Figure 3:
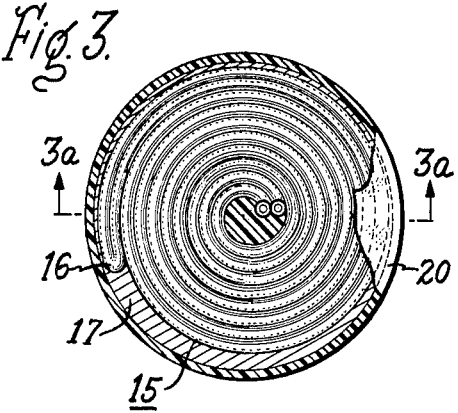
FIGURE 3 is a plan view, partly broken away of still another embodiment of the invention.

In still another modification, as shown in the plan view of FIGURE 3, the wire capacitance member may be in the form of a flat or "pancake" type coil 15 formed of a convolutely wound composite wire members 16, the latter being coiled in double form with its two free ends located near the axis of the coil and the bend portion of the double wire member 16 on the outside of the coil. It will be evident, however, that the coil could be wound so that the bend portion is at the center and the free ends at the outside, if desired. Wire member 16, like that shown in FIGURE 1a, is comprised of a central wire core, a dielectric intermediate layer, and an outer metallic coating.

Figure 3A:
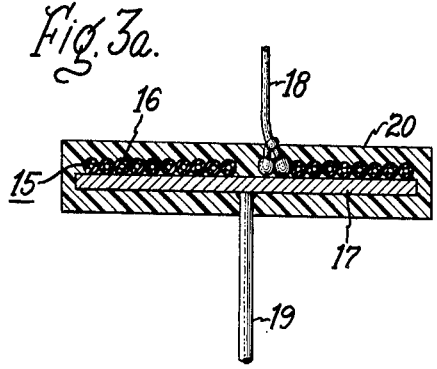

As shown more clearly in the cross-sectional view of FIGURE 3a, coil 15 is arranged flatwise on conductive plate 17 with the metallic coating of the turns of wire member 16 in direct continuous electrical contact therewith, one end of the exposed inner wire 18 extending upwardly to serve as a lead member, and the other end connected thereto, in a manner analogous to that of the FIGURE 1 embodiment. The opposite side of plate 17 has another lead wire 19 connected thereto, and the assembly is encapsulated in a resin casing 20, as in the above described embodiments.

The described arrangements afford numerous advantages over prior type capacitor constructions, especially those employing foil electrodes. The virtual absence of edge regions in the wire forms of the present invention avoids the difficulties due to electrical stresses in the marginal regions of foil type capacitors, and the problems involved in providing adequate and uniform dielectric coverage on the edges thereof are not encountered. Of particular significance is the accurate control afforded by virtue of the invention of capacitance and other electrical properties of very small capacitors. The described construction also markedly facilitates and reduces the cost of manufacture of capacitor units of very low capacitance.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising, in combination, a conducting member, and a capacitance device constituted by composite wire means overlying said conducting member, said composite wire means comprising an inner conducting core, a dielectric layer on said conducting core, and a metallic coating overlying said dielectric layer, said metallic coating having extensive electrically conductive contact with said conducting member along the entire conducting member portion within the capacitor, said composite wire means having free end portions adjacent one another and extending in a direction away from said conducting member, and having the inner conducting core of each end portion connected together.

2. An electrical capacitor comprising, in combination, a conducting lead member, and a plurality of composite wire members circumferentially arranged about said conducting lead member and extending parallel along the length thereof, each composite wire member comprising an inner conducting core, a dielectric layer on said conducting core, and a metallic coating overlying said dielectric layer, said composite wire members through said metallic coatings having extensive electrically conductive contact with said conducting lead member along the entire conducting lead member portion within the capacitor, the inner conducting cores of said composite wire members being electrically connected together at one end thereof.

3. An electrical capacitor comprising, in combination, conducting lead means having a flat surface, a capacitance device constituted by a composite wire member wound in a flat coil and arranged on said surface of said conducting lead means, said composite wire member comprising an inner conducting core, a dielectric layer on said conducting core, and a metallic coating overlying said dielectric layer, said metallic coating having extensive electrically conductive contact with said conducting lead means over substantially the entire surface thereof.

4. An electrical capacitor comprising, in combination, a conducting lead means having a flat surface, a capacitance device constituted by a composite wire member wound in doubled form in a flat coil and arranged on said surface of said conducting lead means, said composite wire member comprising an inner conducting core, a dielectric layer on said conducting core, and a metallic coating overlying said dielectric layer, said metallic coating having extensive electrically conductive contact with said conducting lead means over substantially the entire flat surface of said conducting lead means, the free ends of said coiled wire member having their inner conducting cores exposed at one side of said coil and being electrically connected together.

5. An electrical capacitor as recited in claim 1 including insulating material encapsulated about said composite wire and said conducting member.

References Cited by the Examiner

UNITED STATES PATENTS

| | | | |
|---|---|---|---|
| 2,504,178 | 4/1950 | Burnham et al. | 317—242 |
| 2,530,995 | 11/1950 | Rumpf | 317—242 X |
| 3,041,511 | 6/1962 | Peck et al. | 317—242 |
| 3,047,782 | 7/1962 | McCarthy | 317—242 X |
| 3,123,765 | 3/1964 | Julie | 317—242 X |

FOREIGN PATENTS 889,325    9/1953    Germany.

JOHN F. BURNS, *Primary Examiner.*

LARAMIE E. ASKIN, *Examiner.*